(12) United States Patent
Yoshihara et al.

(10) Patent No.: US 10,712,207 B2
(45) Date of Patent: Jul. 14, 2020

(54) TEMPERATURE SENSOR HAVING A SENSOR BODY HELD BY A SENSOR HOLDER

(71) Applicant: Shibaura Electronics Co., Ltd., Saitama-shi, Saitama (JP)

(72) Inventors: Takamasa Yoshihara, Saitama (JP); Michiru Takemura, Senboku (JP)

(73) Assignee: SHIBAAURA ELECTRONICS CO., LTD., Saitama (JP)

( * ) Notice: Subject to any disclaimer, the term of this patent is extended or adjusted under 35 U.S.C. 154(b) by 386 days.

(21) Appl. No.: 15/540,870

(22) PCT Filed: Feb. 26, 2015

(86) PCT No.: PCT/JP2015/000975
§ 371 (c)(1),
(2) Date: Jun. 29, 2017

(87) PCT Pub. No.: WO2016/135776
PCT Pub. Date: Sep. 1, 2016

(65) Prior Publication Data
US 2017/0370781 A1    Dec. 28, 2017

(51) Int. Cl.
*G01K 7/00* (2006.01)
*G01K 1/14* (2006.01)
(Continued)

(52) U.S. Cl.
CPC ............... *G01K 1/143* (2013.01); *G01K 1/08* (2013.01); *G01K 7/22* (2013.01)

(58) Field of Classification Search
CPC combination set(s) only.
See application file for complete search history.

(56) References Cited

U.S. PATENT DOCUMENTS

| 4,265,117 A | 5/1981 | Thoma et al. |
| 5,765,075 A | 6/1998 | Yamamoto |
| (Continued) | | |

FOREIGN PATENT DOCUMENTS

| CN | 1809733 A | 7/2006 |
| JP | S60-181768 U | 12/1985 |
| (Continued) | | |

OTHER PUBLICATIONS

International Search Report for PCT/JP2015/000975 dated Jun. 2, 2015.
(Continued)

*Primary Examiner* — Lisa M Caputo
*Assistant Examiner* — Nasir U. Ahmed
(74) *Attorney, Agent, or Firm* — Pearne & Gordon LLP (57) ABSTRACT

A temperature sensor that makes it possible to stably and accurately detect temperature irrespective of properties of a detection object surface, which includes a sensor holder extending from a front end side F toward a back end side B; and a sensor body that is held by the sensor holder to locate a thermosensitive device on the front end side F and from which lead wires that are electrically connected to the thermosensitive device are drawn toward the back end side B. The sensor body is supported by the sensor holder at both the front end side F and the back end side B.

6 Claims, 4 Drawing Sheets

(51) Int. Cl.
G01K 7/22 (2006.01)
G01K 1/08 (2006.01)

(56) References Cited

U.S. PATENT DOCUMENTS

| | | | |
|---|---|---|---|
| 6,113,263 | A | 9/2000 | Satoh |
| 7,231,158 | B2 * | 6/2007 | Hiraoka ............ G03G 15/2057 399/69 |
| 2007/0110124 | A1 | 5/2007 | Shiraki et al. |
| 2012/0146563 | A1 | 6/2012 | Zettner |
| 2014/0184031 | A1 | 7/2014 | Kaneshige |

FOREIGN PATENT DOCUMENTS

| | | |
|---|---|---|
| JP | H09138166 A | 5/1997 |
| JP | H10318854 A | 12/1998 |
| JP | 2003227760 A | 8/2003 |
| JP | 2013051806 A | 3/2013 |
| WO | 2011020500 A1 | 2/2011 |

OTHER PUBLICATIONS

Extended European Search Report issued in Patent Application No. EP 15 88 3076 dated Jan. 23, 2018.
Chinese Office Action issued in Patent Application No. CN 201580070617.3 dated Dec. 18, 2017.

* cited by examiner

TEMPERATURE SENSOR HAVING A SENSOR BODY HELD BY A SENSOR HOLDER

This is a National Stage application of PCT international application PCT/JP2015/000975, filed Feb. 26, 2015, which is incorporated herein by reference in its entirety.

TECHNICAL FIELD

The present invention relates to a temperature sensor suitable for, for example, measurement of temperature of a coil in a rotary electric machine.

BACKGROUND ART

In a rotary electric machine such as an electric motor, components configuring the rotary electric machine, for example, a coil experiences a large increase in temperature by operation, which may cause insulation failure and fire damage. Therefore, a temperature sensor is attached to the coil to detect the temperature of the coil.

Patent Literature 1 proposes, in order to stably and accurately measure the temperature of the coil for a long time, a bracket that is fixed to a casing of the rotary electric machine, a metallic elastic arm that extends from the bracket toward an outside surface of a coil end, and a resin thermistor holder that is attached to a front end of the elastic arm to hold a thermistor. The thermistor is brought into contact with the outside surface of the coil end to detect the temperature of the coil end.

In the temperature sensor proposed by Patent Literature 1, it is possible to stably press a temperature detecting site of the thermistor against the outside surface of the coil end for a long time because the elastic arm is made of a metal and the elastic force thereof is not deteriorated with age.

In addition, the elastic arm is formed through insert molding such that a resin layer of the thermistor holder is interposed between the elastic arm and the thermistor. Therefore, heat transmitted through the arm of the bracket is insulated by the resin layer of the thermistor holder, and is not transmitted from the front end of the arm to the thermistor, which makes it possible to prevent the thermistor from being affected by temperature of a casing.

CITATION LIST

Patent Literature

Patent Literature 1: JP2013-51806A

SUMMARY OF INVENTION

Technical Problem

As mentioned above, the temperature sensor of Patent Literature 1 includes the requirements that stably and accurately detect the temperature of the outside surface of the coil end.

The present inventors, however, confirm through examination that the temperature sensor cannot detect the temperature stably and accurately depending on the properties of the coil end with which the temperature sensor comes into contact even when the temperature sensor includes the above-described requirements.

Therefore, an object of the present invention is to provide a temperature sensor that makes it possible to stably and accurately detect temperature irrespective of properties of a detection object surface with which the temperature sensor comes into contact.

Solution to Problem

When the detection object surface of the detection object has a uniformly continuous flat plane, it is sufficient to bring the temperature sensor into parallel contact with the detection object surface. The detection object surface, however, may be inclined or twisted in some cases. In this case, when the detecting surface of the temperature sensor is flat, an area of the surface brought into contact with the detection object surface is insufficient, and the temperature is not accurately detected. On the other hand, the properties of the detection object surface are not uniquely determined. Therefore, it is not possible to shape the detecting surface of the temperature sensor so as to fit the detection object surface. Accordingly, the present inventors focus on a fact that the sensor body of the temperature sensor that comes into contact with the detection object surface is deformed to follow the properties of the detection object surface, which may secure a contact area necessary for accurate detection of the temperature.

Therefore, a temperature sensor according to the present invention includes: a sensor holder extending from a front end side toward a back end side; and a sensor body that is held by the sensor holder to locate a thermosensitive device on the front end side and from which a lead wire is drawn toward the back end side, the lead wire being electrically connected to the thermosensitive device, wherein the sensor body is supported by the sensor holder at both the front end side and the back end side.

The temperature sensor according to the present invention is supported at both the front end side and the back end side. Therefore, when the temperature sensor is pressed against the detection object surface, the temperature sensor is deformed to follow the properties of the detection object surface, which makes it possible to secure a contact area necessary for accurate detection of the temperature.

In the temperature sensor according to the present invention, the sensor body and the sensor holder may preferably have a gap therebetween except for supported portions on both ends, the gap allowing deformation of the sensor body, in order to accurately secure the deformation of the sensor body.

In the temperature sensor according to the present invention, the sensor body may preferably have a rectangular cross-sectional surface, and have a detecting surface that is configured of a flat plane and is pressed against a detection object. When the detection object surface is flat or substantially flat, it is easy to secure a contact area necessary for accurate detection of the temperature.

In the temperature sensor according to the present invention, the sensor body may preferably include a resin cover layer that covers the thermosensitive device and a portion of the lead wire, and the sensor body may be preferably supported by the sensor holder at both ends with the cover layer in between. The resin cover layer has sufficient flexibility, which easily deforms the sensor body to follow the properties of the detection object surface when the temperature sensor is pressed against the detection object surface.

In the temperature sensor according to the present invention, the detecting surface may be preferably shaped in a mountain-fold shape from the front end side toward the back end side, and the sensor body may preferably include a first detecting surface and a second detecting surface with a ridge line therebetween.

When the temperature detection object surface of the detection object has a uniformly continuous flat plane and is parallel to the temperature sensor, it is sufficient for the outside surface of the temperature sensor according to the present invention to have a uniformly continuous flat plane. The temperature detection object surface, however, may be inclined or twisted in some cases. In this case, when the outside surface of the temperature sensor is the uniformly continuous flat plane, it is not possible to sufficiently obtain a contact area between the temperature detection object surface and the outside surface. Therefore, in the present invention, the detecting surface is shaped in the mountain-fold shape, and the detecting surface is pressed against the temperature detection object surface such that the detecting surface is deformed to become close to a flat plane. As a result, the contact surface becomes easy to follow the temperature detection object surface.

Advantageous Effects of Invention

According to the temperature sensor of the present invention, since the sensor body is supported by the sensor holder at both ends, pressing the sensor body against the detection object surface deforms the sensor body to follow the properties of the detection object surface. Therefore, the temperature sensor according to the present invention makes it possible to stably and accurately detect the temperature irrespective of the properties of the detection object surface with which the temperature sensor comes into contact.

BRIEF DESCRIPTION OF DRAWINGS

FIGS. 1A and 1B are perspective views illustrating a temperature sensor according to the present embodiment in which FIG. 1A is a diagram as viewed from a top surface and FIG. 1B is a diagram as viewed from a bottom surface.

FIGS. 2A to 2C are diagrams illustrating the temperature sensor according to the present embodiment in which

FIGS. 3A to 3B are diagrams explaining effects of the temperature sensor according to the present embodiment in which

DESCRIPTION OF EMBODIMENTS

An embodiment of the present invention is described below based on accompanying drawings.

As illustrated in FIG. 1A to FIG. 3B, a temperature sensor 1 according to the present embodiment includes: a sensor body 10; a sensor holder 30 that holds the sensor body 10; and a lead wire fastener 40 that is attached to a back end side B of the sensor holder 30 and holds lead wires 13A and 13B to the sensor holder 30. The lead wires 13A and 13B are drawn from the sensor body 10.

As an example, the temperature sensor 1 is employed to detect the temperature variation of the coil end in such a way that the sensor body 10 is pressed against a coil end of a stator of a rotary electric machine. Further, the sensor body 10 includes a thermosensitive device 11 (see FIGS. 3A, 3B) and a cover layer 20 made of a resin. The thermosensitive device 11 is sealed by the cover layer 20. Therefore, the temperature sensor 1 is suitable for use under environment requiring resistance characteristics. In addition, the temperature sensor 1 has the cover layer 20 that is formed in a rectangular parallelepiped shape, and has a flat detecting surface 25. This allows for surface contact between the detecting surface 25 and the flat detection object surface included in the detection object, which results in high accuracy of detected temperature. Hereinafter, components of the temperature sensor 1 are described, and then action and effects of the temperature sensor 1 are described.

[Sensor Body 10]

Figure 3A:
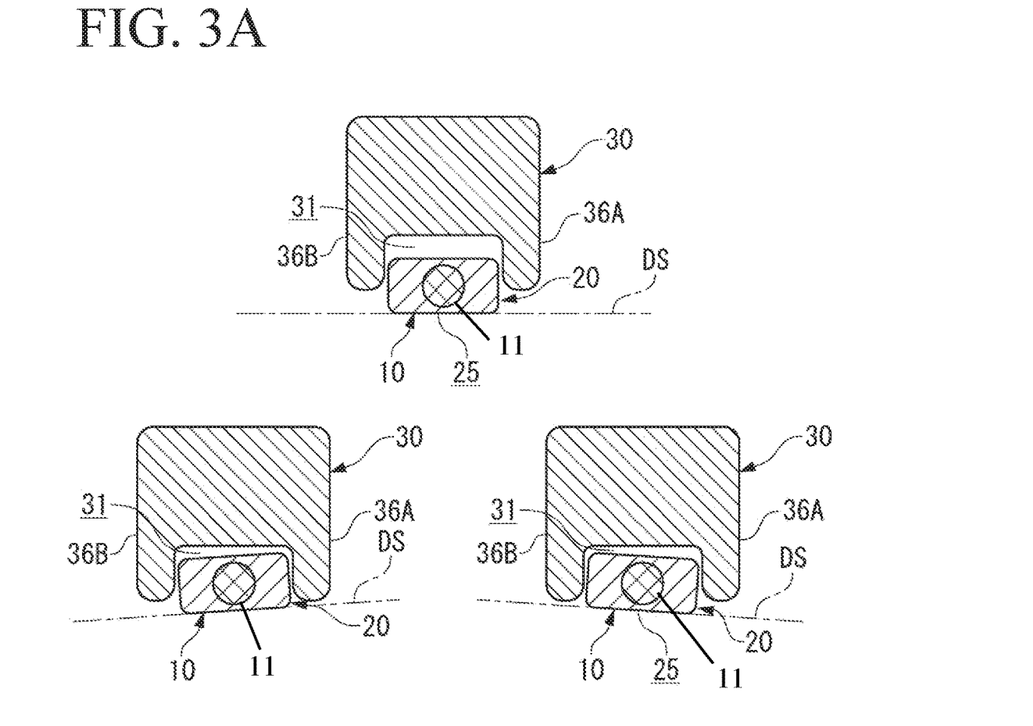
FIG. 3A is a diagram illustrating a state in which a vicinity of a thermosensitive device of a sensor body rotates around an axial direction of the temperature sensor and FIG. 3B is a diagram illustrating a state in which the sensor body is deformed in a longitudinal direction of the temperature sensor.
Figure 3B:
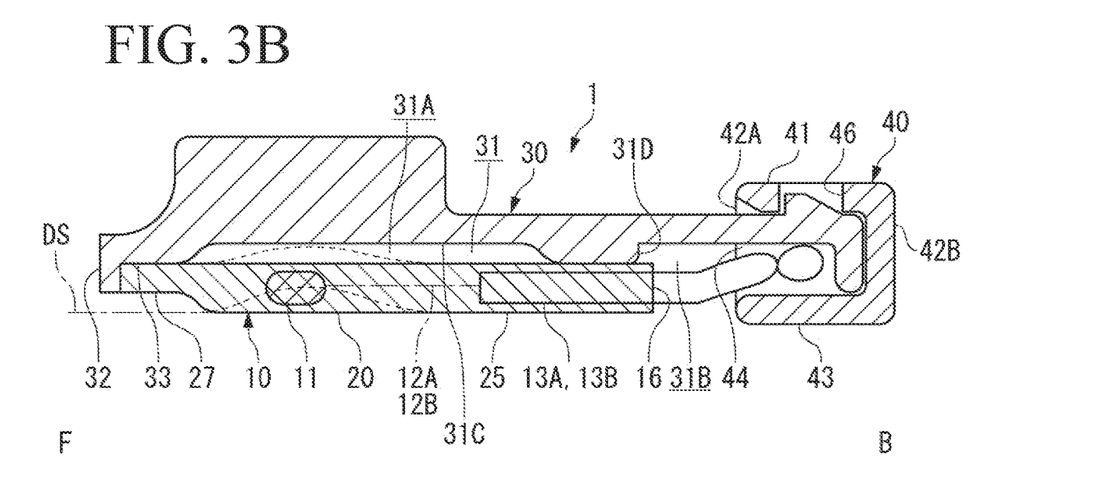

As illustrated in FIG. 3B, the sensor body 10 includes: the thermosensitive device 11; a pair of lead-out wires 12A and 12B that are electrically connected to the thermosensitive device 11; and the lead wires 13A and 13B that are respectively connected to the lead-out wires 12A and 12B.

The thermosensitive device 11 may be configured of, for example, a thermistor that has temperature characteristics in electric resistance.

The lead-out wires 12A and 12B are each made of, for example, a Dumet wire and are connected to the thermosensitive device 11 through an unillustrated electrode.

The lead wires 13A and 13B are connected to an unillustrated temperature measurement circuit through other wires as necessary. Each of the lead wires 13A and 13B has a cover layer as an outermost layer. The cover layer is formed of a fluorine resin such as polytetrafluoroethylene (PTFE) and tetrafluoroethylene-perfluoroalkylvinylether copolymer (PFA).

The sensor body 10 is covered with the cover layer 20 from a front end of the thermosensitive device 11 to an exposure boundary portion 16 of the lead wires 13A and 13B. Therefore, the thermosensitive device 11 and other parts are protected from surrounding environment. The cover layer 20 has a substantially rectangular parallelepiped shape, and the detecting surface 25 that comes into contact with the detection object surface is configured of a flat plane.

The cover layer 20 is made of a fluorine resin similar to the cover layer of each of the lead wires 13A and 13B. The cover layer 20 is formed in the rectangular parallelepiped shape through press processing using a mold that has a rectangular parallelepiped cavity.

The cover layer 20 may have a two-layer structure including an inner layer and an outer layer. This is, however, merely a favorable example, and the cover layer 20 may have a single-layer structure.

The inner layer is disposed inside the outer layer, and directly covers the sensor body 10. The inner layer is formed through melting and coagulating a tubular precursor in a manufacturing process, and the inner layer tightly seals from the front end of the thermosensitive device 11 to the exposure boundary portion 16.

Next, the outer layer is so disposed as to be tightly contacted with the outside of the inner layer. The outer layer provides, together with the inner layer, weatherability to the temperature sensor 1.

[Sensor Holder 30]

Figure 1A:
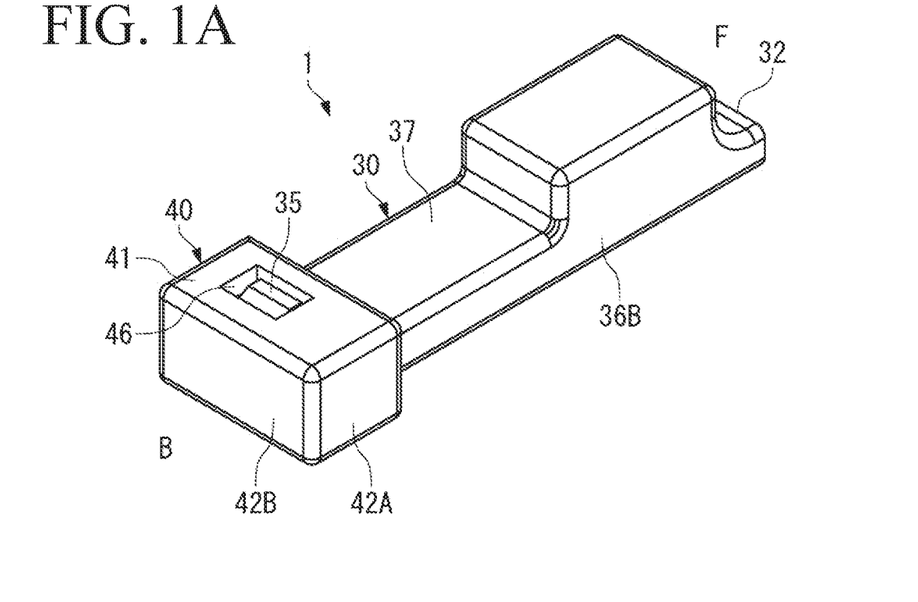
Figure 1B:
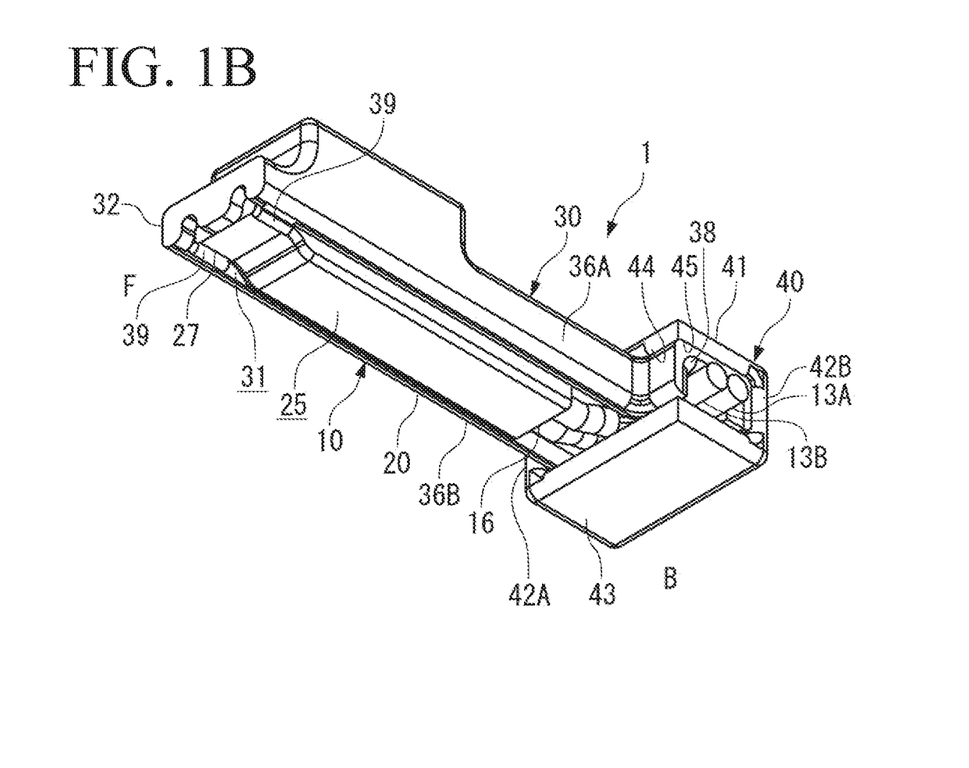
Figure 2A:
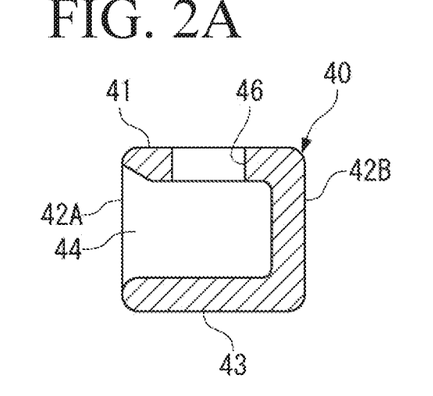
FIG. 2A is a cross-sectional diagram of a lead wire fastener.
Figure 2B:
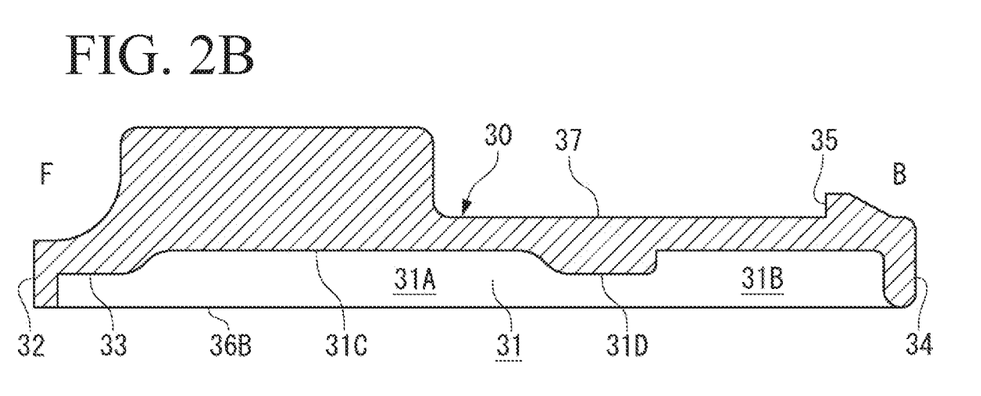
FIG. 2B is a lengthwise cross-sectional diagram of a sensor holder.
Figure 2C:
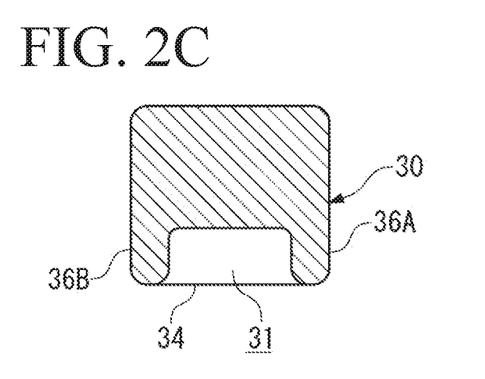
FIG. 2C is a (crosscut) cross-sectional diagram of the sensor holder.

As illustrated in FIGS. 2B and 2C, the sensor holder 30 so houses and holds the sensor body 10 as to expose at least the detecting surface 25 of the sensor body 10 to the outside. The sensor holder 30 is integrally formed through injection molding of a resin.

The sensor holder 30 includes a housing cavity 31 that houses the sensor body 10. A front wall 32, a rear wall 34, a pair of side walls 36A and 36B, and a top wall 37 are provided to form a substantially box shape, thereby surrounding the housing cavity 31. The front wall 32 and the rear wall 34 face each other. An electric wire outlet 38 (FIG. 1B) through which the lead wires 13A and 13B are drawn to the outside is provided near a back end of the side wall 36A.

A front end support base 33 that supports a front end supporting part 27 of the sensor body 10 is provided at a site of the front wall 32 facing the housing cavity 31, as illustrated in FIG. 2B and FIG. 3B. The front end support base 33 is provided at a position recessed from the top of the front wall 32 (the lower end in the drawing) by a thickness of the front end supporting part 27.

The sensor holder 30 includes a partition 31D that partitions the housing cavity 31 into a region on a front end side 31A and a region on a back end side 31B. The partition 31D projects from a bottom 31C of the housing cavity 31 up to a height equal to the height of the front end support base 33, and forms a trapezoidal shape. The partition 31D supports the back end side of the sensor body 10, in addition to partitioning the housing cavity 31 into two regions. Therefore, the partition 31D is set to the height same as the height of the front end support base 33, and a region between the front end support base 33 and the partition 31D is recessed toward the bottom 31C. Although the detail is described later, when the recessed region is provided, the sensor body 10 is deformed to rotate around an axis except for the supported portions on the both ends. In addition, the recessed region allows deformation of the sensor body 10 toward the bottom 31C of the sensor holder 30, and allows the detecting surface 25 to follow the detection object.

[Lead Wire Fastener 40]

As illustrated in FIGS. 1A, 1B and FIGS. 2A to 2C, the lead wire fastener 40 is attached to the back end of the sensor holder 30, thereby guiding the lead wires 13A and 13B of the sensor body 10 to the side of the sensor holder 30, and holding the sensor body 10 to the sensor holder 30 at the back end side. The lead wire fastener 40 is fabricated through injection molding of a resin, and has electric insulation property.

As illustrated in FIGS. 1A, 1B and FIGS. 2A to 2C, the lead wire fastener 40 includes: a top wall 41; side walls 42A and 42B that are respectively suspended from two adjacent sides of the top wall 41; and a bottom wall 43 that faces the top wall 41 and connects the side walls 42A and 42B to each other. Openings of the walls of the lead wire fastener 40 configure a holder insertion port 44 and an electric wire outlet 45. A lock hole 46 into which a lock claw 35 of the sensor holder 30 is inserted is provided on the top wall 41 so as to penetrate the top wall 41.

As illustrated in FIGS. 1A, 1B and FIGS. 2A to 2C, the lead wire fastener 40 is attached to a predetermined position of a back end of the sensor holder 30 and the lock claw 35 is then inserted into the lock hole 46. As a result, the lead wire fastener 40 is positioned and fixed to the sensor holder 30. In addition, the sensor body 10 is locked by latch claws 39 and 39 provided on a front end side F of the sensor holder 30, which prevents the sensor body 10 from coming off from the sensor holder 30 on the front end side. Further, the lead wires 13A and 13B of the sensor body 10 are bent at substantially right angle at the electric wire outlet 38 of the sensor holder 30 (the electric wire outlet 45 of the lead wire fastener 40), thereby being drawn to the outside. The electric wire outlet 38 regulates motion of the respective bent parts of the lead wires 13A and 13B for returning to a linear shape, which prevents the sensor body 10 from coming off from the housing cavity 31 of the sensor holder 30 at the back end side B. Note that the drawing direction of the lead wires 13A and 13B is merely an example.

[Effects of Temperature Sensor 1]

Since the detecting surface 25 of the cover layer 20 is made flat, the temperature sensor 1 comes into surface contact with the flat detection object surface DS, as illustrated in FIG. 3B. Therefore, the temperature sensor becomes high in sensitivity to the temperature variation of the temperature detection object, which contributes to accuracy improvement of detected temperature.

Next, as illustrated in FIG. 3B, the temperature sensor 1 has a both-end supported structure in which the front end side F of the sensor body 10 is supported by the front end support base 33 of the sensor holder 30 and the back end side B is supported by the partition 31D of the sensor holder 30. In addition, the sensor body 10 and the sensor holder 30 have a gap therebetween except for the supported portions on the both ends. This allows the sensor body 10 to rotate around the axial direction as illustrated in FIG. 3A and to warp in the longitudinal direction as illustrated in FIG. 3B, except for the supported portions on the both ends. Accordingly, even if the detection object surface DS is inclined to the sensor holder 30, the sensor body 10 can follow the detection object surface DS as illustrated in FIG. 3A. In addition, even if the detection object surface DS has a protrusion, the sensor body 10 can follow the detection object surface DS as illustrated in FIG. 3B.

Hereinbefore, the preferred embodiment of the present invention is described; however, the configurations described in the above-described embodiment may be selected or may be appropriately modified without departing from the scope of the present invention.

Figure 4A:
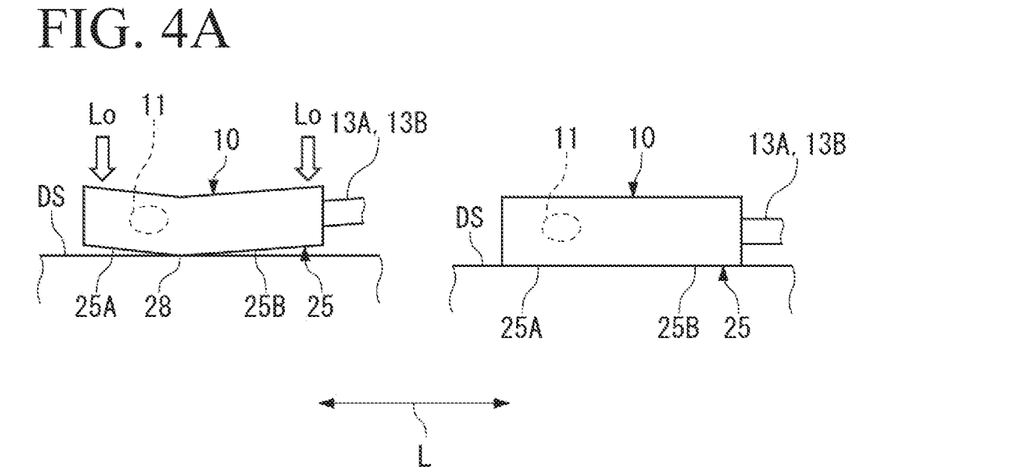
FIGS. 4A to 4C are diagrams explaining effects of more favorable forms of the sensor body according to the present embodiment.
Figure 4B:
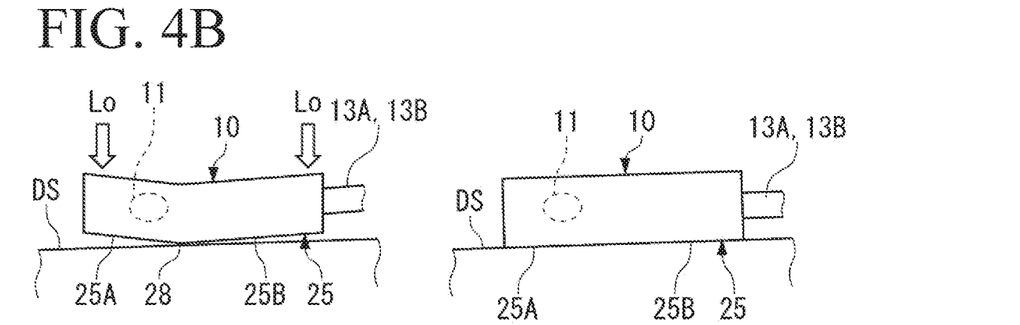
Figure 4C:
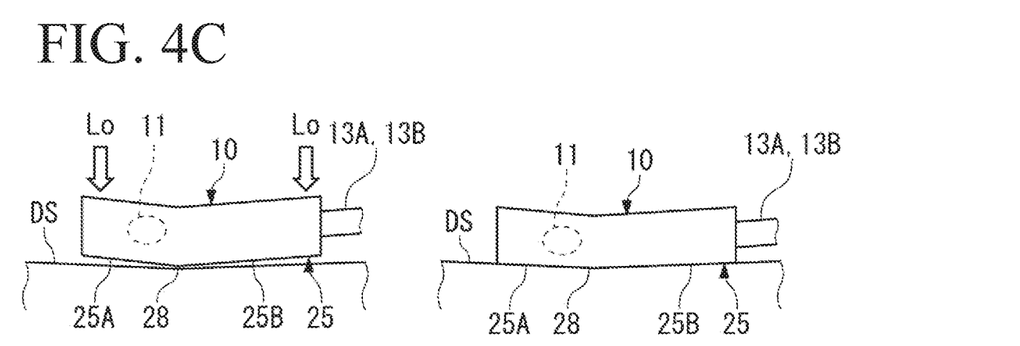

For example, as illustrated in FIG. 1A to FIG. 3B, the cover layer 20 of the sensor body 10 is straight in a longitudinal direction L; however, the cover layer 20 may be bent at a center part in the longitudinal direction L as illustrated in FIGS. 4A to 4C. The sensor body 10 includes a first detecting surface 25A and a second detecting surface 25B. The first detecting surface 25A and the second detecting surface 25B are inclined to each other with, as a boundary, a ridge line 28 that is a bent part, and are each configured of a flat plane.

In FIG. 4A, the detection object surface DS of the temperature detection object is horizontal (on left side in FIG. 4A), and in this case, the ridge line 28 of the detecting surface 25 comes into line contact with the detection object surface DS when no load is applied. Since the sensor body 10 is supported at the both ends, however, when a load Lo is applied to the front end and the back end to press the sensor body 10 against the detection object surface DS, the detecting surface 25 having a mountain-fold shape is deformed to a uniformly continuous flat plane to follow the detection object surface DS, thereby coming into surface contact with the detection object surface DS. At this time, the ridge line 28 comes into contact with the detection object surface DS more tightly than the first detecting surface 25A and the second detecting surface 25B that sandwich the ridge line 28. As mentioned above, shaping the detecting surface 25 in the mountain-fold shape makes it possible to improve deformability of the sensor body 10 having the both-end supported structure.

In addition, even when the detection object surface DS is inclined to a horizontal line as illustrated in FIG. 4B (on left side in FIG. 4B), the detecting surface 25 having the mountain-fold shape is deformed to the uniformly continuous flat plane to follow the detection object surface DS, which makes it possible to bring the detecting surface 25 into surface contact with the detection object surface DS (on right side in FIG. 4B).

Furthermore, even when the detection object surface DS is recessed as illustrated in FIG. 4C (on left side in FIG. 4C), the detecting surface 25 having the mountain-fold shape is deformed to the uniformly continuous flat plane to follow the detection object surface DS, which makes it possible to bring the detecting surface 25 into surface contact with the detection object surface DS (on right in FIG. 4C).

As mentioned above, the sensor body 10 can secure surface contact with the detection object surface DS irrespective of respective properties of various detection object surfaces DS.

In this case, the example in which the entire detecting surface 25 (the first detecting surface 25A and the second detecting surface 25B) comes into surface contact with the detection object surface DS is illustrated; however, partial surface contact may be performed in some cases depending on the properties of the detection object surface DS. It is, however, apparent from the above description with reference to FIGS. 4A to 4C that shaping the detecting surface in the mountain-fold shape makes it easy for the detecting surface to follow the detection object surface DS, and thereby easily obtaining the surface contact, as compared with the case in which the detecting surface 25 is configured of a uniformly continuous flat plane.

When the temperature detection object surface of the detection object has a uniformly continuous flat plane and is parallel to the temperature sensor, it is sufficient for the outside surface of the temperature sensor according to the present invention to have a uniformly continuous flat plane. The temperature detection object surface, however, may be inclined or twisted in some cases. In this case, when the outside surface of the temperature sensor is the uniformly continuous flat plane, it is not possible to sufficiently obtain a contact area between the temperature detection object surface and the outside surface. Therefore, in the present invention, the detecting surface is shaped in the mountain-fold shape, and the detecting surface is pressed against the temperature detection object surface such that the detecting surface is deformed to become close to a flat plane. As a result, the contact surface becomes easy to follow the temperature detection object surface.

Moreover, in the present invention, the supported positions on the both ends are appropriately set according to the detection object and the detection object surface, and are optional.

REFERENCE SIGNS LIST

1 Temperature sensor
10 Sensor body
11 Thermosensitive device
12A, 12B Lead-out wire
13A Lead wire
13A, 13B Lead wire
16 Exposure boundary portion
20 Cover layer
25 Detecting surface
25A First detecting surface
25B Second detecting surface
27 Front end supporting part
28 Ridge line
30 Sensor holder
31 Housing cavity
31A Region on front end side
31B Region on back end side
31C Bottom
31D Partition
32 Front wall
33 Front end support base
34 Rear wall
35 Lock claw
36A, 36B Side wall
37 Top wall
38 Electric wire outlet
39, 39 Latch claw
40 Lead wire fastener
41 Top wall
42A, 42B Side wall
43 Bottom wall
44 Holder insertion port
45 Electric wire outlet
46 Lock hole
DS Detection object surface
Lo Load
L Longitudinal direction
W Width direction
F Front end side
B Back end side

The invention claimed is:

1. A temperature sensor, comprising:
a sensor holder extending from a front end side toward a back end side; and
a sensor body that is held by the sensor holder to locate a thermosensitive device on the front end side and from which a lead wire is drawn toward the back end side, the lead wire being electrically connected to the thermosensitive device, wherein
the sensor body is supported by the sensor holder at both the front end side and the back end side, wherein the sensor body is rotatable around a longitudinal axis of the sensor body to allow the sensor body to follow a detection object surface during use of the temperature sensor,
the sensor body includes a resin cover layer that covers the thermosensitive device and a portion of the lead wire, and
the sensor body is supported by the sensor holder at both ends with the cover layer in between.

2. The temperature sensor according to claim 1, wherein the sensor body and the sensor holder have a gap therebetween except for supported portions on both ends, the gap allowing deformation of the sensor body.

3. The temperature sensor according to claim 2, wherein the sensor body has a detecting surface that is configured of a flat plane and is pressed against a detection object.

4. The temperature sensor according to claim 1, wherein the sensor body has a detecting surface that is configured of a flat plane and is pressed against a detection object.

5. The temperature sensor according to claim 4, wherein the detecting surface is shaped in a mountain-fold shape from the front end side toward the back end side, and the sensor body includes a first detecting surface and a second detecting surface with a ridge line therebetween.

6. The temperature according to claim 4, wherein the detecting surface convexly protrudes in a direction away from the sensor holder, wherein a bent part of the detecting surface defines an apex of the detecting surface.

* * * * *

UNITED STATES PATENT AND TRADEMARK OFFICE
CERTIFICATE OF CORRECTION

PATENT NO.        : 10,712,207 B2
APPLICATION NO.   : 15/540870
DATED             : July 14, 2020
INVENTOR(S)       : Takamasa Yoshihara and Michiru Takemura

Page 1 of 1

It is certified that error appears in the above-identified patent and that said Letters Patent is hereby corrected as shown below:

On the Title Page

Item (73) Assignee:
"SHIBAAURA ELECTRONICS CO., LTD." should be --SHIBAURA ELECTRONICS CO., LTD.--

Signed and Sealed this
Nineteenth Day of January, 2021

Andrei Iancu
*Director of the United States Patent and Trademark Office*